United States Patent
Druet

[15] 3,676,932
[45] July 18, 1972

[54] DEVICE FOR THE PREPARATION OF MIXTURES OF LIQUIDS IN PREDETERMINED PROPORTIONS AND QUANTITIES

[72] Inventor: Charles F. Druet, 43 Allee des Charmilles, 93 Livry-Gargan, France

[22] Filed: May 18, 1970

[21] Appl. No.: 38,350

[30] Foreign Application Priority Data

Nov. 6, 1969   France....................................6938269

[52] U.S. Cl. ........................................................33/126.7 A
[51] Int. Cl.................................................................G01f 23/04
[58] Field of Search ..............................................33/126.7 A

[56] References Cited

UNITED STATES PATENTS

| 2,354,259 | 7/1944 | Grubelic | 33/126.7 A |
| 2,563,601 | 8/1951 | Grubelic | 33/126.7 A |
| 2,672,155 | 3/1954 | Caldwell | 33/126.7 A X |

Primary Examiner—William D. Martin, Jr.
Attorney—Waters, Roditi, Schwartz & Nissen

[57] ABSTRACT

A device for the preparation of mixtures of liquids in predetermined proportions and quantities, comprising the combination of a gauge adapted to be displaced vertically, a device serving as a meter and indicating the position of said gauge, a driving system for said meter and a transmission lever interposed between said gauge and the driving system of said meter, said transmission lever being pivotally mounted about a shaft which is adjustable in position so as to vary the position of said gauge for the same value indicated on said meter. The gauge may be either of the blade type or a float co-operating with a needle and graduated scale.

2 Claims, 1 Drawing Figure

Patented July 18, 1972
3,676,932
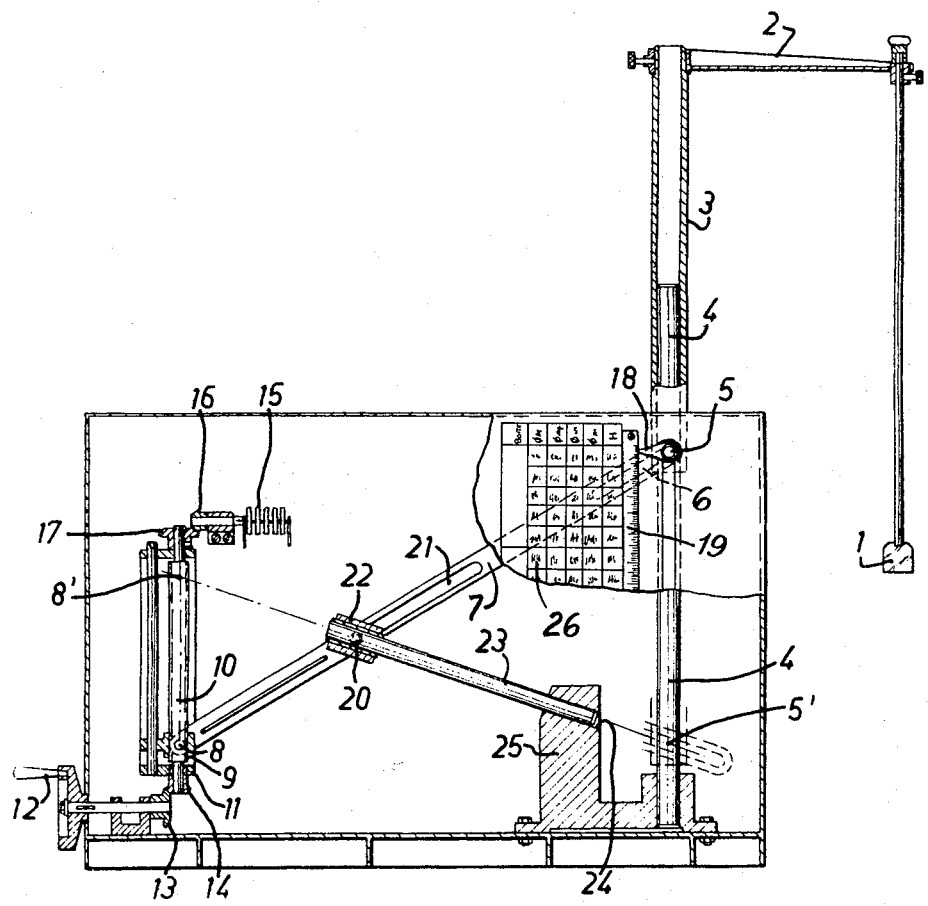

DEVICE FOR THE PREPARATION OF MIXTURES OF LIQUIDS IN PRE-DETERMINED PROPORTIONS AND QUANTITIES

The present invention relates to the preparation of mixtures of liquid products in pre-determined quantities and proportions.

It has more precisely for its object a simple, practical and inexpensive apparatus which enables such mixtures to be prepared with accuracy.

To this end, it has already been proposed to utilize an apparatus comprising a gauge brought to the level of a liquid and being capable of moving or being moved vertically, the said gauge being connected by mechanical or electrical means to a graduated indicator device forming a meter, in which a pointer moves against a scale as a function of the vertical position of the gauge. By using a cylindrical receptacle and calibrating the meter so that it displays a graduation 0 when the gauge is in contact with the bottom of the receptacle, it is possible to prepare mixtures in pre-determined proportions by displacing the gauge so as to indicate successively gauge heights corresponding to determined volumes of the various constituents of the mixture. In fact, a definite height of the gauge corresponds to a determined graduation of the indicator scale, and in consequence to a pre-determined volume in the interior of the receptacle.

Apparatus of this kind is for example utilized for the preparation of paints and, in particular, in the technique of painting automobile vehicles. In fact, for the purposes of repairs, garagists require very variable quantities of paint of various shades, which must correspond very exactly to the color of the bodywork in course of repair, and must be proportional to the size of the surface to be covered.

Paint manufacturers thus supply their representatives with basic products, without the addition of dryers, and offer them a complete list of formulas of mixtures enabling the desired tint and quality to be obtained at will. Rather than use precision balances, users generally prefer to prepare the mixtures which they need by utilizing an apparatus of the type referred to above, which is particularly simple to handle.

Apparatus of this kind however lends itself badly to the preparation of different quantities of the same mixture, since it only enables the ratios of the volumes of the various constituents to be regulated. In order to prepare different quantities of the same composition with an apparatus of this type, it is thus necessary either to employ receptacles of different sections and use the same graduating scale on the meter of the apparatus, or to use different scales with the same receptacle, or again to combine these two possibilities.

The first solution is simple but it comprises the necessity of using receptacles of very small section with respect to their height, for small quantities. The second solution has the risk of reading errors by confusion of the scales and especially lacks precision for the small quantities corresponding to small heights, since the accuracy is proportional to the displacement of the gauge. Finally, the third solution partly eliminates these disadvantages, but considerably complicates the operations and increases the risk of errors.

It has therefore been proposed to utilize an apparatus of the above type arranged in such manner as to employ only a single indicator scale, but enabling the amplitude of this scale to be varied, which permits the preparation of all the desired quantities, within the usual limits, with the same receptacle or with a small number of receptacles.

An improved apparatus of this kind comprises a member controlling the displacement of the gauge — a crank handle for example — connected to a meter, with a continuous speed-varying device interposed between the control member and the gauge. For the same number of revolutions of the handle, that is to say for the same indication on the meter, there is thus obtained a vertical displacement of the gauge which depends on the ratio selected on the speed-varying device. However, apart from the fact that an apparatus thus arranged is costly, its accuracy is doubtful since a slip may always take place on the speed-varying device, and the wear of the parts modifies the relative positions of the members corresponding to pre-determined ratios of volumes.

The present invention is intended to remedy these disadvantages, by proposing an apparatus which is robust, accurate, cheap and faithful, since it has no speed-varying device, in which it is nevertheless possible to utilize one single indicator scale permitting the mixture of the constituents of the composition to be prepared in a pre-determined ratio, while varying the amplitude of the scale adopted, so as to prepare different quantities of the same composition.

According to the invention, this apparatus comprises a member rigidly fixed to the gauge and coupled through the intermediary of a transmission lever to a member the displacement of which is a function of that of the gauge, the said member being in turn connected to an indicator device, while the said lever is pivotally mounted with respect to a shaft which is adjustable in position, so that with successive indications corresponding to a definite composition, it is possible to vary the successive displacements of the gauge, that is to say the quantity of the composition prepared.

In one form of embodiment of the invention, the member fixed to the gauge may be mounted to slide along a vertical guiding post, the transmission lever being coupled by its extremities, on the one hand to this member and on the other to a nut co-operating with an endless vertical screw driven in rotation, for example by a crank handle connected to a revolution counter serving as the indicator device. The displacements of the extremity of the lever connected to the member are shown by a pointer fixed to the connection between the said lever and the member and moving opposite a vertical scale.

The adjustable pivotal axis of the lever may for example occupy a plurality of positions along a fixed guiding rod inclined at a pre-determined angle. The geometric axis of the fixed guiding rod is defined in a very precise manner by the position of the point of coupling between the lever and the screw when the revolution counter indicates zero, and by the position of the coupling point between the lever and the member when the pointer faces the zero graduation of the vertical scale.

As the lever is articulated on a shaft adjustable in position on the fixed frame of the guiding rod, it will be understood that it is only necessary to vary the position of this shaft in order to modify the ratio of the lever arms and in consequence to modify the displacement of the gauge, corresponding to the same number of revolutions of the handle.

According to a particular form of embodiment, the adjustable shaft is carried by a ring slidably mounted on the guiding rod, and is engaged in a longitudinal slot of the lever. The ring is capable of being moved and fixed along the guiding rod by the action of known means. As the endless screw and the guiding post are fixed in position, it is necessary that at least one of the moving members (nut or member carrying the gauge) is not rigidly fixed to the lever, while being driven by this latter. For example, it will only be necessary for one of these moving members to comprise an element engaged in a longitudinal slot in the lever.

One form of embodiment of the invention will now be described with reference to the accompanying single FIGURE, which is a diagrammatic view in elevation of the apparatus.

In this form of embodiment, a gauge 1 is carried in known manner by a horizontal arm 2 rigidly connected to the extremity of a tubular sleeve 3, slidably mounted on a guiding post 4.

A stud 5, fixed on the sleeve 3 is engaged in a slot 6 formed at the extremity of a lever 7, the other extremity of which is articulated by a shaft 8 on a nut 9. This latter is screwed on a vertical endless screw 10 pivotally mounted in a base 11 and capable of pivoting about its geometric axis by the effect of a crank handle 12 having a horizontal shaft which drives a toothed pinion 13 and a pinion 14 with a vertical axis, rigidly fixed to the screw 10. The crank-handle 12 also drives a revolution counter 15 serving as a meter, by means of the drive of a pinion 16 fixed to the meter, by a toothed pinion 17 rigidly fixed on the screw 10.

The stud 5 also carries a pointer 18 which thus moves at the same time as the gauge 1. The position of the pointer 18 is checked by means of a vertical graduated scale 19, the zero graduation of which is of course located at the bottom. The position of the pointer 18 with regard to the scale 19 indicates the position of the gauge.

According to the invention, a shaft 20, adjustable in position, is engaged in a longitudinal slot 21 formed in the central portion of the lever 7. The adjustable shaft 20 is carried by a ring 22 slidably mounted on an inclined guiding rod 23 and capable of being locked in any position on this rod. Thus, the shaft 20 may serve as a pivotal shaft adjustable at will for the lever 7. The locking of the ring 22 may be effected by any known means, for example by means of a clamping screw (not shown).

The inclination of the guiding rod is defined accurately. To this end, the rod 23 is clamped along an end portion by an inclined bore 24, pierced in a rigid frame 25 in which is also engaged the lower extremity of the post 4. The bore 24 is machined with care, since it is this which determines the inclination of the guiding rod 23. As shown in the drawing, the axis of the rod 23 is determined in a very accurate manner by the position of the shaft 8 when the meter 15 indicates zero, and by the position of the stud 5 when the pointer 18 is located opposite the zero graduation of the scale 19. These two positions are defined on the drawing by the intersection of the extension of the geometric axis of the rod 23 with the geometric axis of the endless screw 10 and with the geometric axis of the post 4, and having respectively the references 8' and 5'. The figure shows in chain-dotted lines the corresponding position of one extremity of the lever 7.

It is clear that when these conditions are obtained, the axis of the slot 21 is parallel to the axis of the guiding rod 23, and that the position of the ring 22 and therefore of the shaft 20 becomes independent of the zero of the scale, and therefore of the gauge. In other words, displacement of the shaft 20 does not cause the gauge to move.

On the other hand, when the lever 7 occupies a position other than that described above, it is clear that for a definite position of the shaft 20, any value indicated on the meter 15 corresponds to a well-defined position of the gauge 1, so that by using a receptacle (not shown) arranged directly below the gauge 1, and filling this receptacle with various liquids in such manner that the level of the mixture comes successively level with the gauge at various vertical positions corresponding to various values indicated by the meter, it is possible to prepare a well-defined composition, the proportions of the different constituents being determined by the values displayed on the meter 15.

The adjustment of the quantity of mixture desired is effected in the following manner:

The shaft 20 is freed and can then move along the rod 23.

The moving parts of the mechanism are then placed in the position which they must occupy when the mixture is completed, which means that:

The meter must indicate the total number of parts entering into the composition of the mixture to be prepared. To do this, the crank-handle 12 is rotated.

The pointer 18 must indicate on the scale 19 the height of the mixture to be obtained. This height corresponds to a definite volume, according to the receptacle employed. The correspondence between heights and volumes may be given on an associated table 26.

These two adjustments being made, the shaft 20 is located at its correct position. The shaft 20 is then locked on the rod 23.

The crank-handle 12 is finally rotated until the meter reads zero. The gauge 1 is then adjusted so as to touch the bottom of the receptacle. The apparatus is thus ready for the preparation of the desired quantity of mixture.

It will of course be understood that the invention is not limited to the above form of embodiment alone. It is applicable equally well to a device operating by the same principle, but in which the pallet gauge can be replaced by a float device acting on a needle which pivots in front of a dial. When this needle comes opposite the zero graduation, the float is at the desired level.

What I claim is:

1. A device for use in the preparation of mixtures of liquids in predetermined proportions and quantities, comprising in combination a gauge adapted for vertical movement relative to a receptacle for the mixture to be prepared, a vertical guide post, a member rigidly connected to said gauge and slidable on said guide post, meter means indicating the values of the constituent parts of the mixture in the receptacle, drive means for said meter means including a vertical endless screw and a crank for rotating said screw about its geometric axis, a transmission lever connected at its opposite ends to said rigidly connected member and to said endless screw and pivoted midway its ends on a shaft adjustable in position axially of said transmission lever, a graduated scale, and a pointer mounted on said rigidly connected member for movement relative to said scale to indicate the position of said gauge relative to the mixture in the receptacle, wherein adjustment of said shaft varies the position of said gauge in accordance with the value indicated by said meter means.

2. A device as claimed in claim 1, including an inclined guide rod and a ring carrying said adjustable pivot shaft of said transmission lever and slidable on said guide rod for adjustment in selected positions, and wherein the geometric axis of said guide rod passes through the position of the connection between the said transmission lever and said endless screw, when said meter means indicates zero, and through the position of the connection between said lever and said rigidly connected member when said pointer is located at the zero position on said graduated scale.

* * * * *